(12) United States Patent
Ide et al.

(10) Patent No.: US 11,404,945 B2
(45) Date of Patent: Aug. 2, 2022

(54) STATOR ASSEMBLY METHOD AND STATOR ASSEMBLY APPARATUS

(71) Applicant: AISIN CORPORATION, Kariya (JP)

(72) Inventors: Mitsuhiro Ide, Okazaki (JP); Hiromasa Suzuki, Okazaki (JP)

(73) Assignee: AISIN CORPORATION, Kariya (JP)

( * ) Notice: Subject to any disclaimer, the term of this patent is extended or adjusted under 35 U.S.C. 154(b) by 375 days.

(21) Appl. No.: 16/631,193

(22) PCT Filed: Aug. 9, 2018

(86) PCT No.: PCT/JP2018/029881
§ 371 (c)(1),
(2) Date: Jan. 15, 2020

(87) PCT Pub. No.: WO2019/031573
PCT Pub. Date: Feb. 14, 2019

(65) Prior Publication Data
US 2020/0220438 A1 Jul. 9, 2020

(30) Foreign Application Priority Data
Aug. 9, 2017 (JP) .............................. JP2017-154236

(51) Int. Cl.
*H02K 15/08* (2006.01)
*H02K 1/16* (2006.01)
(Continued)

(52) U.S. Cl.
CPC ............. *H02K 15/085* (2013.01); *H02K 1/16* (2013.01); *H02K 15/066* (2013.01); *H02K 15/10* (2013.01)

(58) Field of Classification Search
CPC ........ H02K 15/085; H02K 15/10; H02K 1/16; H02K 15/06
See application file for complete search history.

(56) References Cited

U.S. PATENT DOCUMENTS 7,788,790 B2 9/2010 Neet
2011/0099797 A1 5/2011 Mishina et al.
(Continued)

FOREIGN PATENT DOCUMENTS

| JP | 2011-97791 A | 5/2011 |
| JP | 2013-55862 A | 3/2013 |
| JP | 2016-127693 A | 7/2016 |

OTHER PUBLICATIONS

Oct. 30, 2018 International Search Report issued in International Patent Application No. PCT/JP2018/029881.

*Primary Examiner* — Burton S Mullins
(74) *Attorney, Agent, or Firm* — Oliff PLC

(57) ABSTRACT

A stator assembly method of assembling a stator that includes a stator core that includes a slot that has an opening that opens on one side in a radial direction, a coil that includes a slot-housed portion housed in the slot, and insulation disposed between the slot and the slot-housed portion, the method including disposing the insulation in the slot; opening a portion of the insulation on the one side in the radial direction by inserting a first guide jig into the insulation, which is disposed in the slot, along a center axis direction of the stator core, after disposing the insulation; and inserting the slot-housed portion into the slot via the opening by moving the coil and the first guide jig together toward the other side in the radial direction with respect to the stator core, after opening the portion of the insulation.

18 Claims, 9 Drawing Sheets

(51) Int. Cl.
*H02K 15/06* (2006.01)
*H02K 15/10* (2006.01)
*H02K 15/085* (2006.01)

(56) References Cited

U.S. PATENT DOCUMENTS

2014/0201979 A1   7/2014  Yamaguchi
2018/0254681 A1*  9/2018  Hashimoto ............ H02K 15/04

* cited by examiner

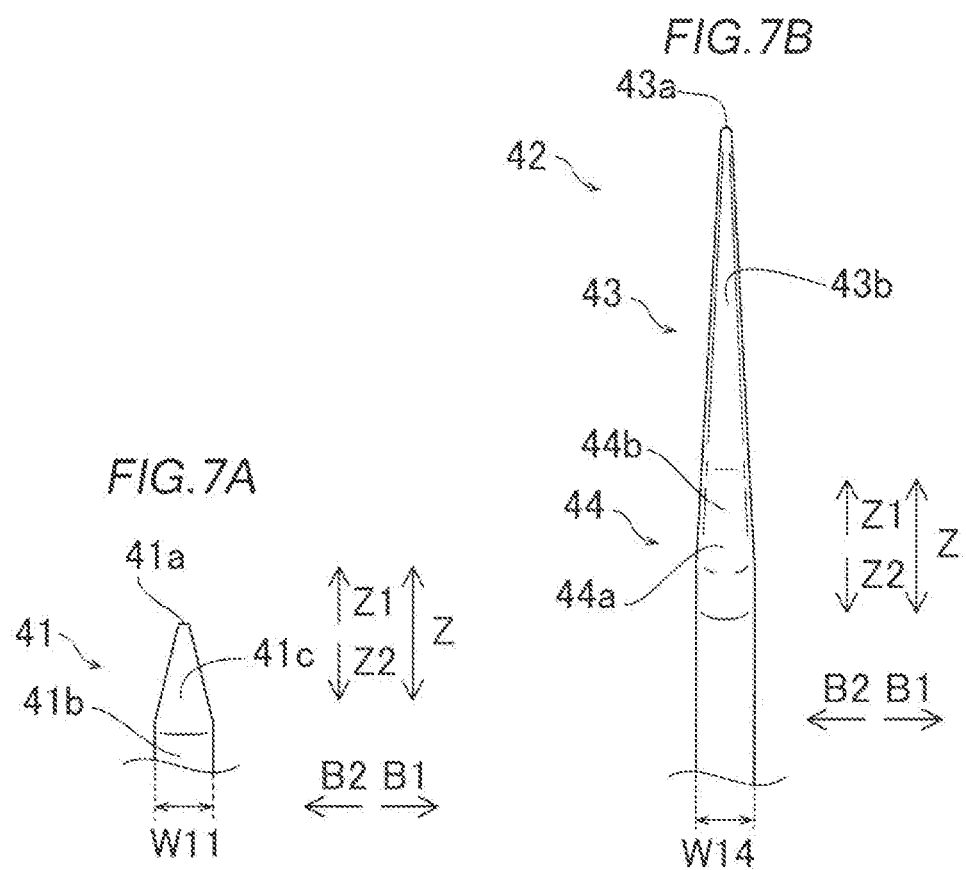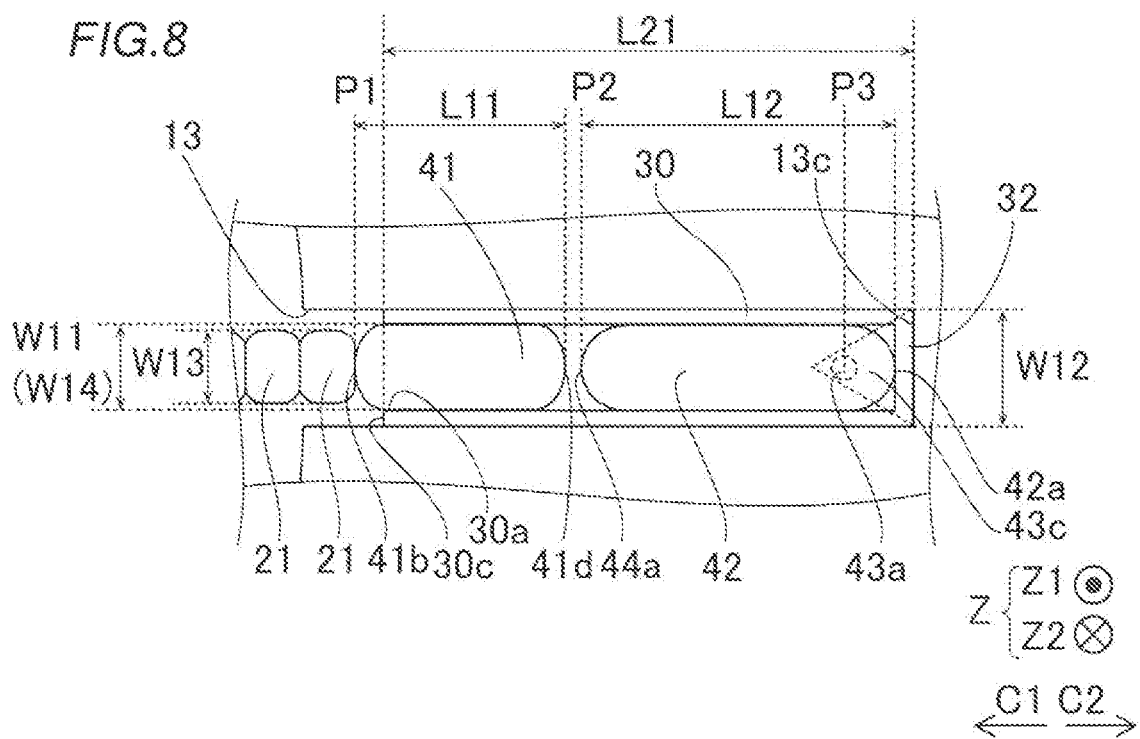

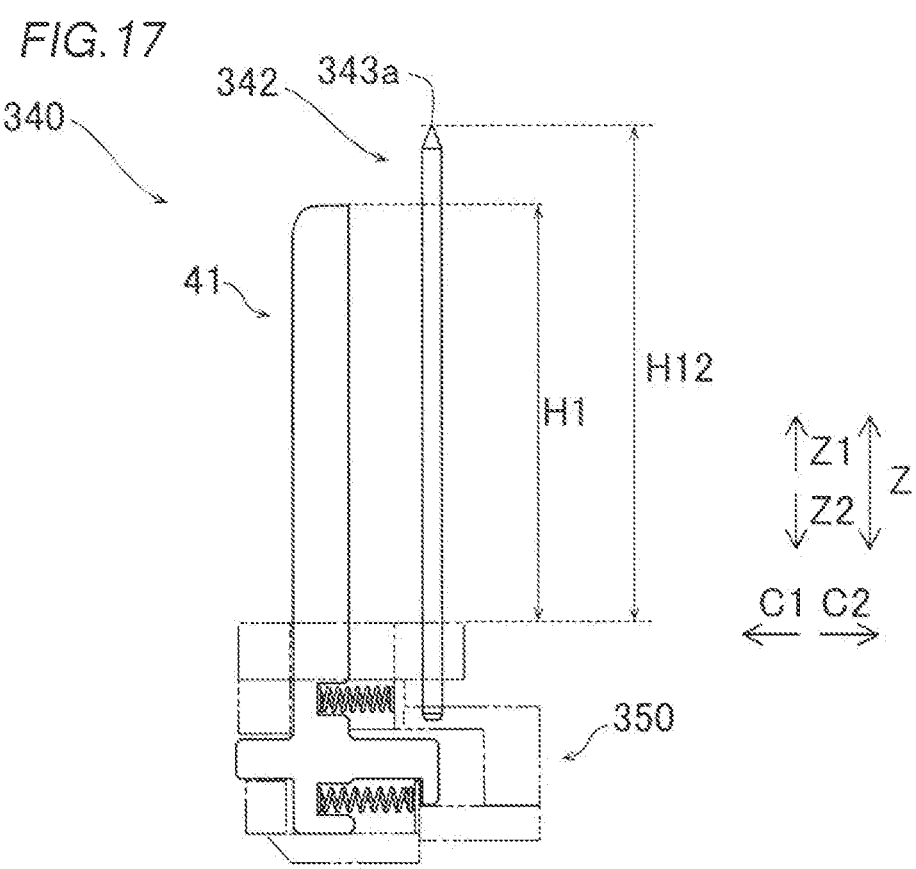

STATOR ASSEMBLY METHOD AND STATOR ASSEMBLY APPARATUS

BACKGROUND

The present disclosure relates to a stator assembly method and a stator assembly apparatus, and in particular to a stator assembly method and a stator assembly apparatus in which a slot-housed portion of a coil is inserted into a slot of a stator core by moving the coil in the radial direction of the stator core.

Hitherto, there has been known a stator assembly method in which a slot-housed portion of a coil is inserted into a slot of a stator core by moving coil in the radial direction of the stator core. Such a stator assembly method is disclosed in U.S. Pat. No. 7,788,790, for example.

In the stator assembly method described in U.S. Pat. No. 7,788,790, an insulating member is disposed in a core slot (hereinafter referred to as a "slot") of a stator core, a jig is disposed inside the insulating member thereafter, and a slot segment (coil segment) is moved from the radially outer side toward the radially inner side to insert the slot segment into the slot. In this stator assembly method, the jig is inserted inside the insulating member such that the insulating member is interposed between the jig and the side surfaces of the slot. A radially inner opening portion on the inner side in the radial direction of the insulating member is opened by the jig. When the slot segment and the jig are moved together from the radially inner side toward the radially outer side, the slot segment is disposed in the slot and inside the insulating member.

SUMMARY

In the stator assembly method described in U.S. Pat. No. 7,788,790, however, the slot segment (hereinafter referred to as a "slot-housed portion") is moved while being pressed from the radially inner side toward the radially outer side, and therefore it is considered that the slot-housed portion is occasionally returned (sprung back) to the radially inner side by a restoring force. In the stator assembly method described in U.S. Pat. No. 7,788,790, it is considered that the slot-housed portion and the jig are located away from each other in the case where the slot-housed portion is sprung back when the slot-housed portion is inserted into the slot. In this case, it is considered that a portion of the insulating member positioned in a gap between the slot-housed portion and the jig is occasionally housed in the gap as slackened convexly toward the inside of the slot compared to a different portion of the insulating member (a portion thereof interposed between the slot-housed portion or the jig and the side surfaces of the stator core). In the case where the slot-housed portion is further moved radially outward with a part of the insulating member housed in the gap in the slackened state, the insulating member is moved radially outward together with the slot-housed portion with the insulating member (slackened portion) and the slot-housed portion mechanically interfering with each other. Therefore, it is considered that the insulating member is deformed in shape. As a result, in the stator assembly method according to the related art described in U.S. Pat. No. 7,788,790, the insulation between the slot-housed portion and the slot may not be secured appropriately since the insulating member is deformed in shape.

An exemplary aspect of the disclosure provides a stator assembly method and a stator assembly apparatus that can reliably secure the insulation between a slot-housed portion of a coil and a slot by preventing an insulating member from being deformed in shape when the coil is inserted into the slot of a stator core.

A first aspect of the present disclosure provides a stator assembly method of assembling a stator that includes a stator core that includes a slot that has an opening that opens on one side in a radial direction, a coil that includes a slot-housed portion housed in the slot, and insulation disposed between the slot and the slot-housed portion, the method including: disposing the insulation in the slot; opening a portion of the insulation on the one side in the radial direction by inserting a first guide jig into the insulation, which is disposed in the slot, along a center axis direction of the stator core, after disposing the insulation; and inserting the slot-housed portion into the slot via the opening by moving the coil and the first guide jig together toward the other side in the radial direction with respect to the stator core, after opening the portion of the insulation, wherein inserting the slot-housed portion includes inserting the slot-housed portion into the slot via the opening by moving the coil and the first guide jig together toward the other side in the radial direction with respect to the stator core against an urging force by pressing the slot-housed portion against the first guide jig toward the other side in the radial direction with the first guide jig urged toward the one side in the radial direction. The phrase "opening the insulating member" or "opening the insulation" as used herein means varying the gap (width) inside the insulation so as to become larger.

With the stator assembly method according to the first aspect of the present disclosure, as described above, the slot-housed portion can be inserted into the slot with a portion of the insulation for introduction of the slot-housed portion (portion thereof on the one side in the radial direction) opened, by performing the step of inserting the slot-housed portion into the slot via the opening portion after the step of opening the portion of the insulation on the one side in the radial direction. Thus, interference between the slot-housed portion and the insulation can be prevented. Consequently, it is possible to reliably secure the insulation between the slot-housed portion of the coil and the slot by preventing the insulation from being deformed in shape when the coil is inserted into the slot of the stator core. By moving the coil and the first guide jig together toward the other side in the radial direction with respect to the stator core, the slot-housed portion can be guided and moved toward the other side in the radial direction while maintaining a state in which the portion of the insulation on the one side in the radial direction is opened by the first guide jig. That is, the slot-housed portion can be moved to a predetermined position in the slot while maintaining a state in which the coil and the insulating member do not interfere with each other. Thus, the slot-housed portion can be disposed in the slot while further preventing the insulation from being deformed in shape. As a result, the insulation between the slot-housed portion and the slot can be further secured.

In the stator assembly method according to the first aspect of the present disclosure, as described above, the step of inserting the coil is a step of inserting the slot-housed portion into the slot via the opening by moving the coil and the first guide jig together toward the other side in the radial direction with respect to the stator core against an urging force by pressing the slot-housed portion against the first guide jig toward the other side in the radial direction with the first guide jig urged toward the one side in the radial direction. Consequently, even in the case where the slot-housed portion is sprung back, the first guide jig and the slot-housed portion press each other in the radial direction because of the urging force, and thus the first guide jig and the slot-housed portion can be prevented from moving away from each other in the radial direction. Therefore, the insulation can be prevented from being housed in a gap in the radial direction between the first guide jig and the slot-housed portion. Thus, the insulation can be further prevented from being deformed in shape when the coil is inserted into the slot of the stator core. By preventing occurrence of a state in which the slot-housed portion is not guided by the first guide jig, interference between the slot-housed portion and the insulation can be reliably prevented by the first guide jig. For example, even in the case where the assembly apparatus is configured such that the coil is intermittently pressed toward the other side in the radial direction to vary a force for the slot-housed portion to press the first guide jig, a state in which the slot-housed portion and the first guide jig contact each other can be maintained since the first guide jig presses the slot-housed portion of the coil with the urging force.

A second aspect of the present disclosure provides a stator assembly method of assembling a stator that includes a stator core that includes a slot that has an opening that opens on one side in a radial direction, a coil that includes a slot-housed portion housed in the slot, and an insulation disposed between the slot and the slot-housed portion, the method including: disposing the insulation in the slot; opening a portion of the insulation on the one side in the radial direction by inserting a first guide jig into the insulation, which is disposed in the slot, along a center axis direction of the stator core, after disposing the insulation; and inserting the slot-housed portion into the slot via the opening by moving the coil and the first guide jig together toward the other side in the radial direction with respect to the stator core, after opening the portion of the insulation, wherein opening the portion of the insulation includes opening a portion of the insulation on the one side in the radial direction by inserting a second guide jig, which is fixed in radial position, into the slot along the center axis direction at a radial position on the other side in the radial direction with respect to the first guide jig, and opening the portion of the insulation at a position of insertion of the first guide jig, and by inserting the first guide jig into the slot along the center axis direction after start of insertion of the second guide jig.

With the stator assembly method according to the second aspect of the present disclosure which is configured as described above, as with the stator assembly method according to the first aspect described above, it is possible to provide a stator assembly method that can reliably secure the insulation between the slot-housed portion of the coil and the slot by preventing the insulation from being deformed in shape when the coil is inserted into the slot of the stator core.

With the stator assembly method according to the second aspect of the present disclosure, in which the step of opening the insulation is configured as described above, the slot-housed portion can be guided by the first guide jig with the insulation opened by the second guide jig. Consequently, the insulation can be prevented from being slackened convexly toward the inside of the slot. Thus, the insulation can be prevented from being housed in a gap in the radial direction between the first guide jig and the slot-housed portion. As a result, the insulation can be further prevented from being deformed in shape when the coil is inserted into the slot of the stator core. In the case where the portion of the insulation on the one side in the radial direction is closed, it is considered that the closed portion of the insulation and the first guide jig which is inserted in the axial direction may interfere with each other. With the stator assembly method according to the second aspect which is configured as described above, in contrast, the portion of the insulation on the other side in the radial direction is relatively opened, unlike the portion of the insulation on the one side in the radial direction (on the opening portion side). For example, if the insulation is provided with a portion (back wall portion) corresponding to the bottom portion (root portion: portion on the back yoke side) of the slot, the portion of the insulation on the other side in the radial direction is opened. Consequently, a gap for insertion of the first guide jig can be formed in the insulation by inserting the second guide jig into a portion of the insulation which is opened and at which interference does not tend to occur. Thus, the portion of the insulation on the one side in the radial direction can be opened easily by the first guide jig while preventing interference between the first guide jig and the insulation.

A third aspect of the present disclosure provides a stator assembly apparatus that assembles a stator that includes a stator core that includes a slot that has an opening that opens on one side in a radial direction, a coil that includes a slot-housed portion housed in the slot, and an insulation disposed between the slot and the slot-housed portion, the apparatus including: an insulating member opener that includes a first guide jig configured to be movable along a center axis direction of the stator core and the radial direction of the stator core, and to open a portion of the insulation on the one side in the radial direction with the first guide jig inserted into the insulation, which is disposed in the slot, along the center axis direction; and a coil inserter that inserts the slot-housed portion into the slot via the opening by moving the coil and the first guide jig together toward the other side in the radial direction with respect to the stator core, wherein: the insulating member opener includes an urger that urges the first guide jig toward the one side in the radial direction; and the coil inserter includes a presser that presses the slot-housed portion against the first guide jig toward the other side in the radial direction against an urging force exerted by the urger.

With the stator assembly apparatus according to the third aspect of the present disclosure which is configured as described above, as with the stator assembly method according to the first aspect described above, it is possible to provide a stator assembly apparatus that can reliably secure the insulation between the slot-housed portion of the coil and the slot by preventing the insulation from being deformed in shape when the coil is inserted into the slot of the stator core. As with the stator assembly method according to the first aspect described above, even in the case where the slot-housed portion is sprung back, the first guide jig and the slot-housed portion press each other in the radial direction because of the urging force, and thus the first guide jig and the slot-housed portion can be prevented from moving away from each other in the radial direction. Therefore, the insulation can be prevented from being housed in a gap in the radial direction between the first guide jig and the slot-housed portion. Thus, the insulation can be further prevented from being deformed in shape when the coil is inserted into the slot of the stator core.

A fourth aspect of the present disclosure provides a stator assembly apparatus that assembles a stator that includes a stator core that includes a slot that has an opening that opens on one side in a radial direction, a coil that includes a slot-housed portion housed in the slot, and an insulation disposed between the slot and the slot-housed portion, the apparatus including: an insulating member opener that includes a first guide jig configured to be movable along a center axis direction of the stator core and the radial direction of the stator core, and to open a portion of the insulation on the one side in the radial direction with the first guide jig inserted into the insulation, which is disposed in the slot, along the center axis direction; and a coil inserter that inserts the slot-housed portion into the slot via the opening by moving the coil and the first guide jig together toward the other side in the radial direction with respect to the stator core, wherein the insulating member opener includes a second guide jig configured to be movable along the center axis direction, fixed at a radial position on the other side in the radial direction with respect to the first guide jig, and inserted into the slot along the center axis direction.

With the stator assembly apparatus according to the fourth aspect of the present disclosure which is configured as described above, as with the stator assembly method according to the first aspect described above, it is possible to provide a stator assembly apparatus that can reliably secure the insulation between the slot-housed portion of the coil and the slot by preventing the insulation from being deformed in shape when the coil is inserted into the slot of the stator core. With the stator assembly apparatus according to the fourth aspect of the present disclosure which is configured as described above, as with the stator assembly method according to the second aspect described above, the slot-housed portion can be guided by the first guide jig with the insulation opened by the second guide jig. Consequently, the insulation can be prevented from being slackened convexly toward the inside of the slot. Thus, the insulation can be prevented from being housed in a gap in the radial direction between the first guide jig and the slot-housed portion. As a result, the insulation can be further prevented from being deformed in shape when the coil is inserted into the slot of the stator core.

With the present disclosure, as described above, it is possible to reliably secure the insulation between the slot-housed portion of the coil and the slot by preventing the insulation from being deformed in shape when the coil is inserted into the slot of the stator core.

BRIEF DESCRIPTION OF THE DRAWINGS

FIG. 7 illustrates the tapered shape of the first guide jig (FIG. 7A) and the second guide jig (FIG. 7B) according to the embodiment.

FIG. 8 illustrates a state in which the first guide jig and the second guide jig are disposed in a slot according to the embodiment.

FIG. 17 illustrates the configuration of an insulating member opening portion according to a modification of the embodiment.

DETAILED DESCRIPTION OF EMBODIMENTS

An embodiment of the present disclosure will be described below with reference to the drawings.

[Structure of Stator]

Figure 1:
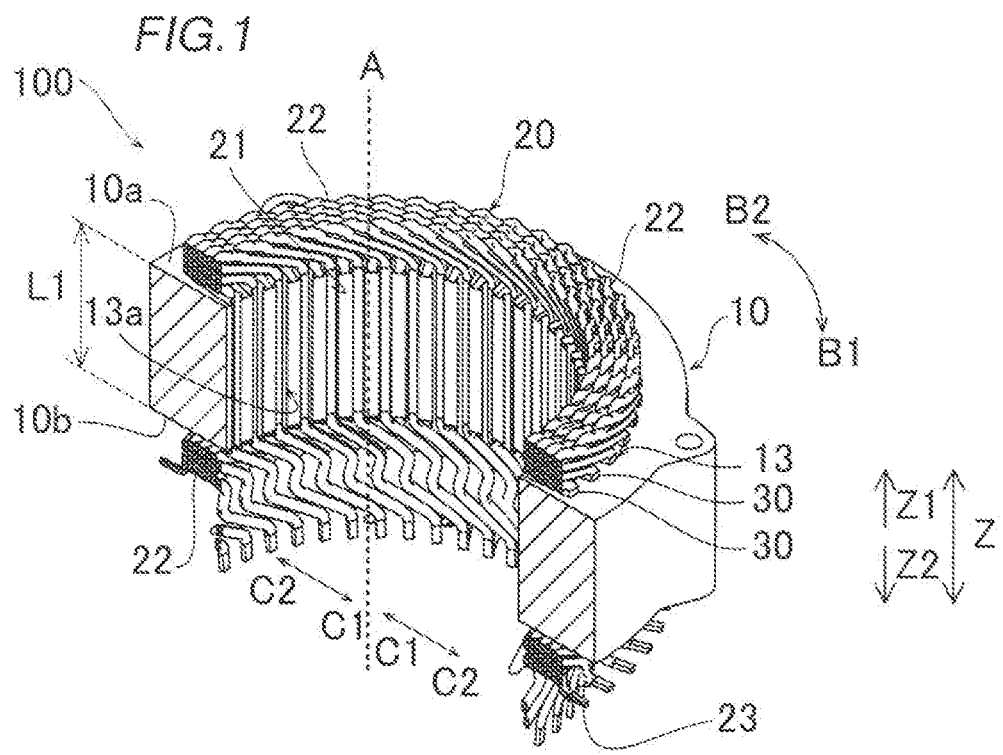
FIG. 1 is a perspective sectional view of a stator according to an embodiment.

The structure of a stator 100 according to the present embodiment will be described with reference to FIGS. 1 to 4. FIG. 1 illustrates a perspective sectional view of the stator 100 (in a semi-circular shape). However, the stator 100 is formed in an annular shape.

The terms "center axis direction" and "axial direction" as used herein mean the direction (Z direction) along a center axis A (rotational axis of a rotor) of a stator core 10 (stator 100) illustrated in FIG. 1. The term "circumferential direction" means the circumferential direction (B1 direction or B2 direction) of the stator core 10. The term "radial direction" means the direction of the radius of the stator core 10. The term "radially inner side" means the direction (C1 direction) toward the center of the stator core 10. The term "radially outer side" means the direction (C2 direction) toward the outside of the stator core 10. The radially inner side is an example of the "one side in the radial direction." The radially outer side is an example of the "other side in the radial direction."

In the present embodiment, as illustrated in FIG. 1, the stator 100 includes the stator core 10 which includes slots 13 that have opening portions 13a (openings) that open radially inward, coils 20 that include slot-housed portions 21 to be housed in the slots 13, and insulating sheets 30 disposed between the slots 13 and the slot-housed portions 21. The insulating sheets 30 are an example of the "insulating member" and "insulation."

Figure 2:
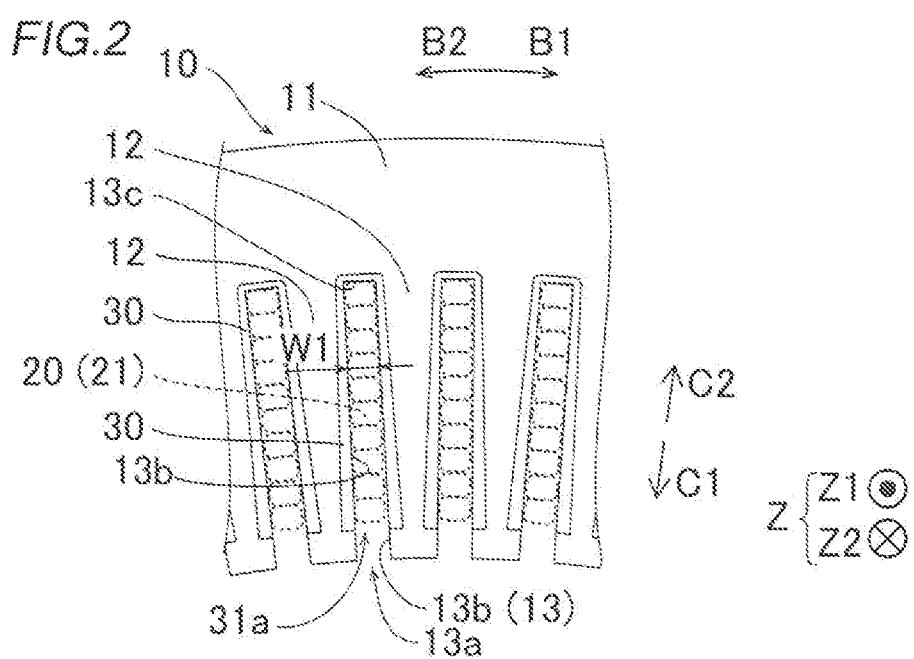
FIG. 2 is a partial enlarged view of the stator according to the embodiment as seen in the axial direction.

As illustrated in FIG. 2, the stator core 10 includes a back yoke 11 and a plurality of teeth 12 that extend radially inward from the back yoke 11. The teeth 12 are disposed at equal angular intervals along the circumferential direction of the stator core 10. The slots 13 are formed between two adjacent teeth 12, and hold the coils 20 by housing the slot-housed portions 21 of the coils 20. A plurality of slots 13 are arranged circumferentially on the radially inner side of the stator core 10. The plurality of slots 13 are formed so as to have a generally uniform width W1 in the circumferential direction at any radial position. The width W1 means the distance between inner wall surfaces 13b of the slots 13 in the circumferential direction.

Figure 3:
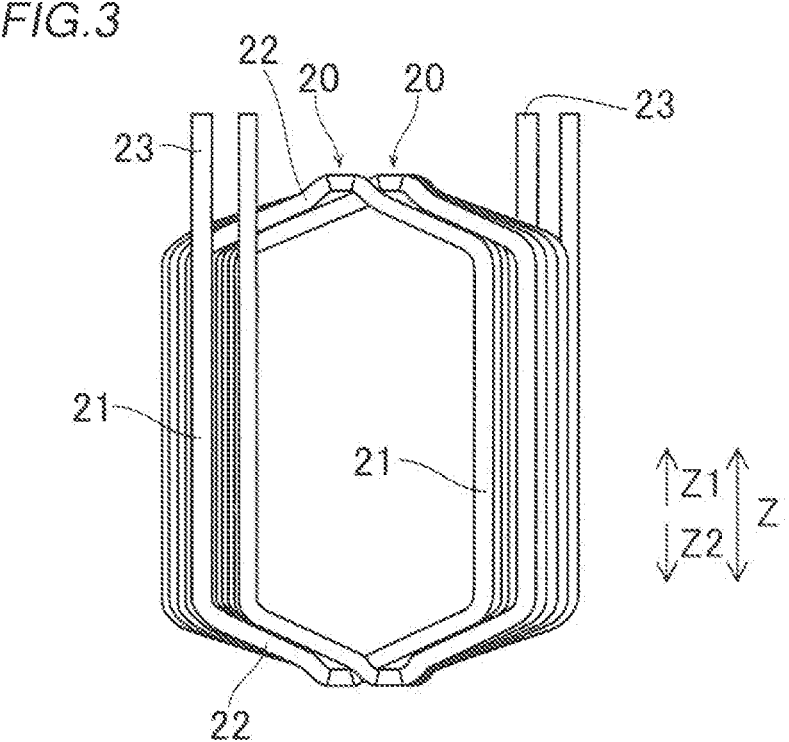
FIG. 3 is a side view of coils according to the embodiment.

The coils 20 are constituted of a rectangular conductor wire that has a generally rectangular sectional shape. As illustrated in FIG. 3, the coils 20 are formed in an annular shape by winding the rectangular conductor wire a plurality of times to be shaped into a predetermined shape (e.g. a hexagonal shape or an octagonal shape). A plurality of coils 20 are disposed in the circumferential direction in the slots 13 of the stator 100. The plurality of coils 20 are arranged circumferentially so as to form an annular shape (see FIG. 1) along the inner periphery of the stator core 10 as a whole.

The coil 20 includes a pair of slot-housed portions 21 to be housed in different slots 13 of the stator core 10 in an annular shape. The coil 20 also includes a pair of coil end portions 22 formed continuously with the pair of slot-housed portions 21 and disposed on the outer sides of the slots 13 in the axial direction. The coil 20 further includes lead wire portions 23 that extend from the slot-housed portions 21.

The slot-housed portions 21 are formed in a generally linear shape, and disposed in different slots 13 to extend from one end surface 10a of the stator core 10 in the axial direction to the other end surface 10b. The coil end portions 22 are formed as bent in a generally triangular shape as seen from the radially inner side. As illustrated in FIG. 1, one of the pair of coil end portions 22 is disposed on the outer side of the one end surface 10a of the stator core 10, and the other thereof is disposed on the outer side of the other end surface 10b of the stator core 10.

As illustrated in FIG. 2, the insulating sheets 30 are disposed along the inner wall surfaces 13b of the plurality of slots 13 in the circumferential direction and an inner wall surface 13c thereof on the radially outer side. The insulating sheets 30 have a function of insulating the coils 20 and the slots 13 from each other. For example, the insulating sheets 30 are formed of one of Nomex (registered trademark) and Kapton (registered trademark) or a combination thereof. The Nomex is fibers (paper) formed from an aramid polymer. The insulating sheets 30 may be constituted from a core material formed of a PEN (polyethylene naphthalate) film and aramid fibers provided so as to cover both surfaces of the core material.

Figure 4:
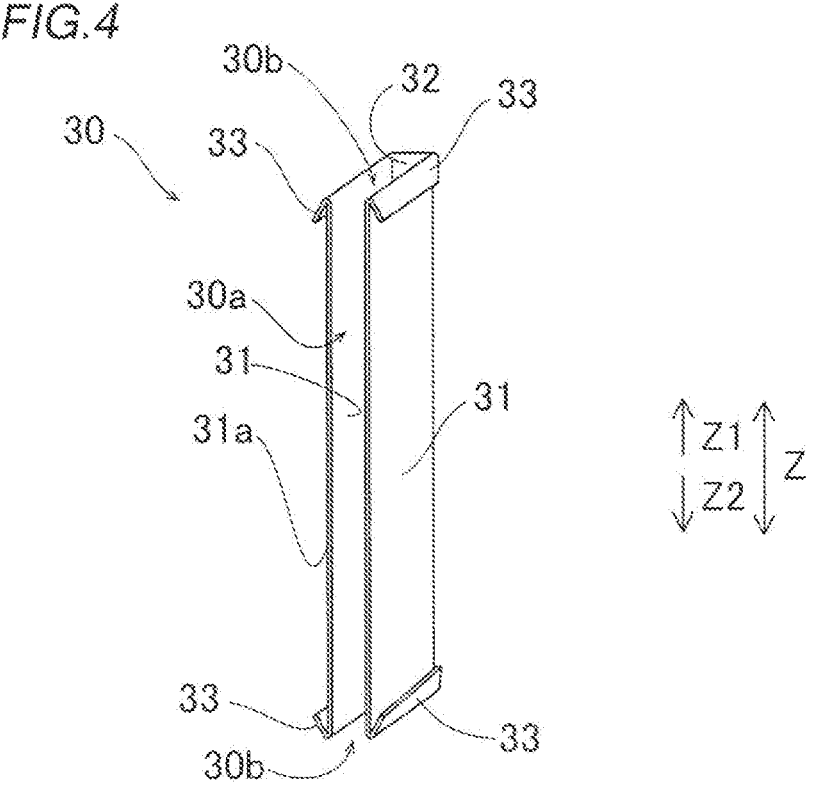
FIG. 4 is a perspective view of an insulating sheet according to the embodiment.

As illustrated in FIG. 4, the insulating sheet 30 has a shape along the inner wall surfaces 13b and 13c of the slot 13. Specifically, the insulating sheet 30 is formed so as to have a generally U-shape as seen in the axial direction and a generally rectangular shape as seen in the circumferential direction. The insulating sheet 30 in a generally U-shape is formed by being folded from a flat plate shape. The insulating sheet 30 includes side wall portions 31 that contact the inner wall surfaces 13b of the slot 13, a back wall portion 32 that contacts the inner wall surface 13c, and collar-like portions 33 disposed on the outer sides in the axial direction with respect to the slot 13 and formed in a collar-like shape (folded-back shape). The insulating sheet 30 also has a radially opening portion 30a that opens radially inward, and axially opening portions 30b on both sides in the axial direction. The side wall portions 31, the back wall portion 32, and the collar-like portions 33 are formed continuously with each other. The radially opening portion 30a is an example of the "portion on one side in the radial direction."

[Structure of Stator Assembly Apparatus]

The structure of an assembly apparatus 200 for the stator 100 according to the present embodiment will be described with reference to FIGS. 5 to 14. The assembly apparatus 200 for the stator 100 according to the present embodiment is an assembly apparatus 200 which assembles the stator 100 (see FIG. 1) which includes the stator core 10 which includes the slots 13 which have the radially opening portions 30a, the coils 20 which include the slot-housed portions 21 to be housed in the slots 13, and the insulating sheets 30 which are disposed between the slots 13 and the slot-housed portions 21.

(Configuration of Insulating Member Opening Portion)

Figure 5:
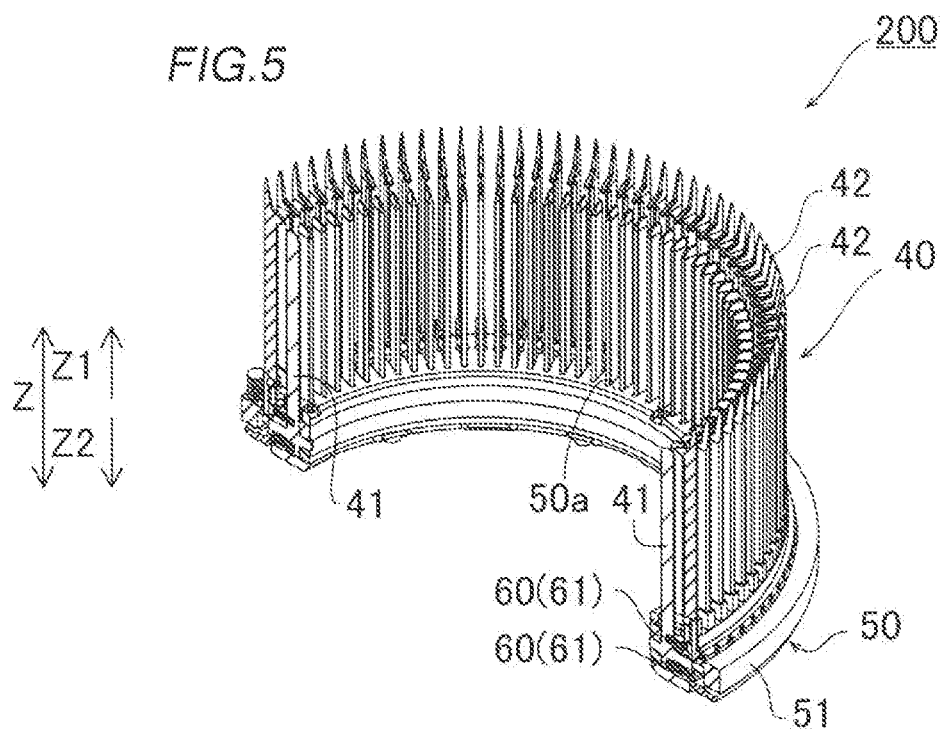
FIG. 5 is a perspective sectional view of an insulating member opening portion according to the embodiment.

As illustrated in FIG. 5, the assembly apparatus 200 includes an insulating member opening portion 40. The insulating member opening portion 40 is configured to open the radially opening portions 30a of the insulating sheets 30. Specifically, the insulating member opening portion 40 includes first guide jigs 41, second guide jigs 42, a base portion 50, and an urging portion 60. For example, the respective numbers of the first guide jigs 41 and the second guide jigs 42 are the same as the number of the slots 13, and the first guide jigs 41 and the second guide jigs 42 are disposed at equal angular intervals on the base portion 50 in an annular shape. The base portion 50 is an example of the "jig moving mechanism portion."

(Structure of First Guide Jigs and Base Portion)

Figure 6:
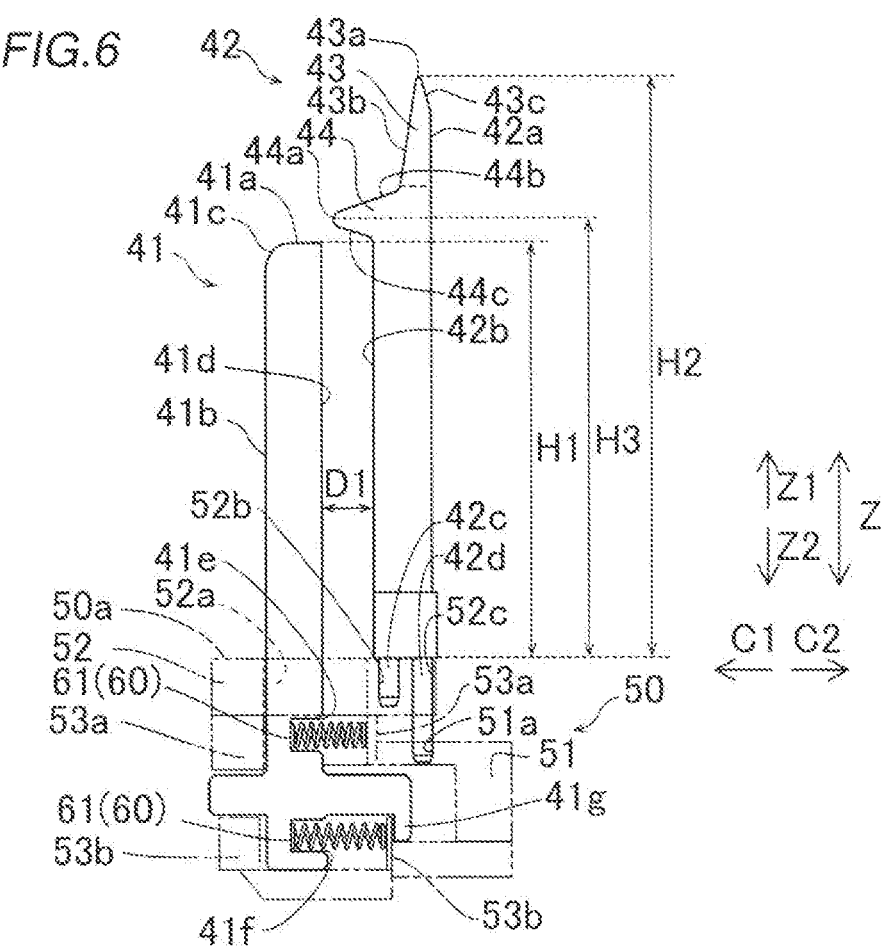
FIG. 6 is a side view illustrating the configuration of a first guide jig, a second guide jig, and a base portion according to the embodiment.

The first guide jigs 41 are each formed in a flat plate shape. As illustrated in FIG. 6, the plurality of first guide jigs 41 are provided so as to project in the arrow Z1 direction from an upper end portion 50a of the base portion 50. For example, a projection height H1 of the first guide jig 41 is larger than a length (height) L1 (see FIG. 1) from the end surface 10a of the stator core 10 to the end surface 10b. Consequently, a distal end portion 41a of the first guide jig 41 projects from the end surface 10a of the stator core 10 when the first guide jig 41 is disposed in the slot 13. The projection height H1 is the length from the upper end portion 50a of the base portion 50 to the distal end portion 41a of the first guide jig 41.

The distal end portion 41a and a radially inner end portion 41b of the first guide jig 41 are smoothly connected to each other by an arcuate portion 41c. As illustrated in FIG. 7A, the first guide jig 41 is tapered toward the distal end portion 41a.

As illustrated in FIG. 6, a radially outer end portion 41d of the first guide jig 41 and a radially inner end portion 42b of the second guide jig 42 are disposed a distance D1 away from each other. Recessed portions 41e and 41f dented radially inward are provided in a portion of the first guide jig 41 disposed inside the base portion 50. An elastic member 61 of the urging portion 60 to be discussed later is disposed in each of the recessed portions 41e and 41f. The first guide jig 41 is provided with an engagement portion 41g to be engaged with the base portion 50.

As illustrated in FIG. 8, the first guide jig 41 has an elliptical shape (or a rectangular shape) as seen in the axial direction. For example, the length from the radially inner end portion 41b of the first guide jig 41 to the radially outer end portion 41d is L11. A width W11 of the first guide jig 41 in the circumferential direction is smaller than a width W12 of the slot 13, and larger than a width W13 of the slot-housed portion 21, for example. In the present embodiment, the radially inner end portion 41b of the first guide jig 41 is disposed at generally the same radial position as a radially inner end portion 30c of the insulating sheet 30, or at a radial position P1 on the radially inner side with respect to the end portion 30c. FIG. 8 illustrates a case where the end portion 41b is disposed at the radial position P1 on the radially inner side with respect to the end portion 30c.

In the present embodiment, the first guide jig 41 is configured to be movable along the axial direction and the radial direction of the stator core 10. The first guide jig 41 configured to open the radially opening portion 30a of the insulating sheet 30 with the first guide jig 41 inserted along the axial direction into the insulating sheet 30 which is disposed in the slot 13. The first guide jig 41 is also configured such that the coil 20 and the first guide jig 41 are moved together toward the outer side in the radial direction with respect to the stator core 10 with the first guide jig 41 contacted by the slot-housed portion 21.

Specifically, as illustrated in FIG. 6, the first guide jig 41 is moved in the axial direction when the base portion 50 is moved in the axial direction with the first guide jig 41 disposed on the base portion 50. The base portion 50 includes a radially outer base portion 51, an upper base portion 52, and lower base portions 53a and 53b. The radially outer base portion 51 is disposed on the radially outer side with respect to the first guide jig 41. A fixed portion 42d of the second guide jig to be discussed later is fixed to the radially outer base portion 51.

Figure 9A:
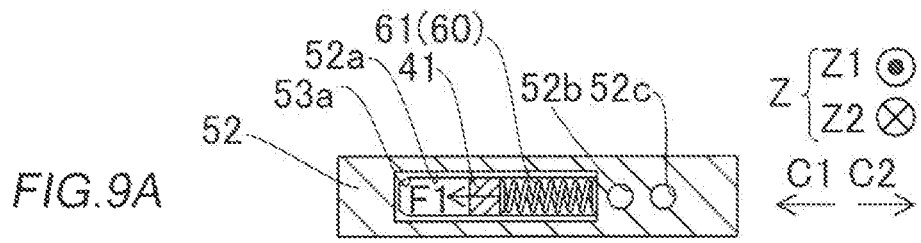
FIG. 9 illustrates the configuration of the base portion (FIG. 9A) and an urging portion (FIG. 9B) according to the embodiment as seen in the axial direction.

As illustrated in FIG. 9A, the upper base portion 52 is provided with a hole portion 52a, in which the first guide jig 41 is to be disposed. The radially opening width of the hole portion 52a is larger than the length L11 of the first guide jig 41 in the radial direction. Consequently, the first guide jig 41 is changeable in the radial position while being fixed in the circumferential position. An elastic member 61 is disposed between the inner wall portion of the lower base portion 53a and the recessed portion 41e of the first guide jig 41. In addition, an elastic member 61 is disposed between the inner wall portion of the lower base portion 53b and the recessed portion 41f of the first guide jig 41.

Figure 9B:
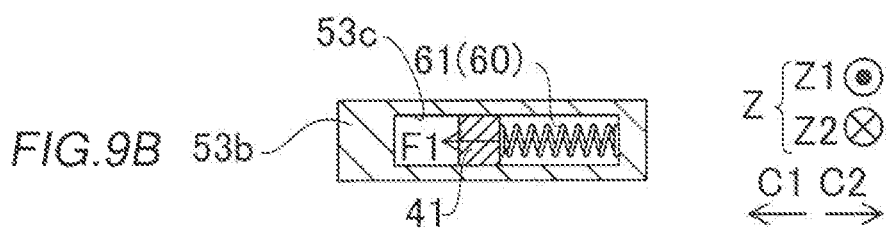

As illustrated in FIG. 9B, the urging portion 60 which is constituted from the elastic members 61 and the lower base portions 53a and 53b is configured to urge the first guide jig 41 radially inward. Specifically, the elastic members 61 are configured to be elastically deformable in the radial direction. The elastic members 61 are spring members, for example. The elastic members 61 are disposed in the lower base portions 53a and 53b in a compressed and deformed state, and configured to urge the recessed portions 41e and 41f of the first guide jig 41 radially inward with an expansion force as an urging force F1.

Figure 10:
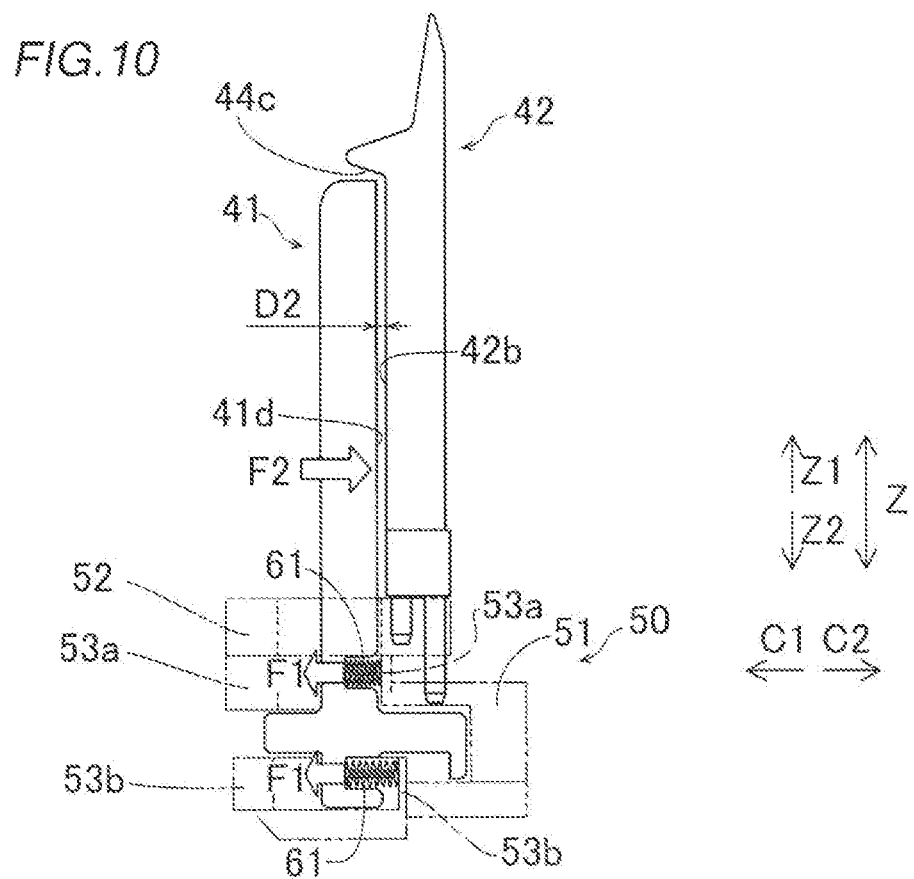
FIG. 10 illustrates the state of the first guide jig and the second guide jig after the first guide jig is moved according to the embodiment.
Figure 11:
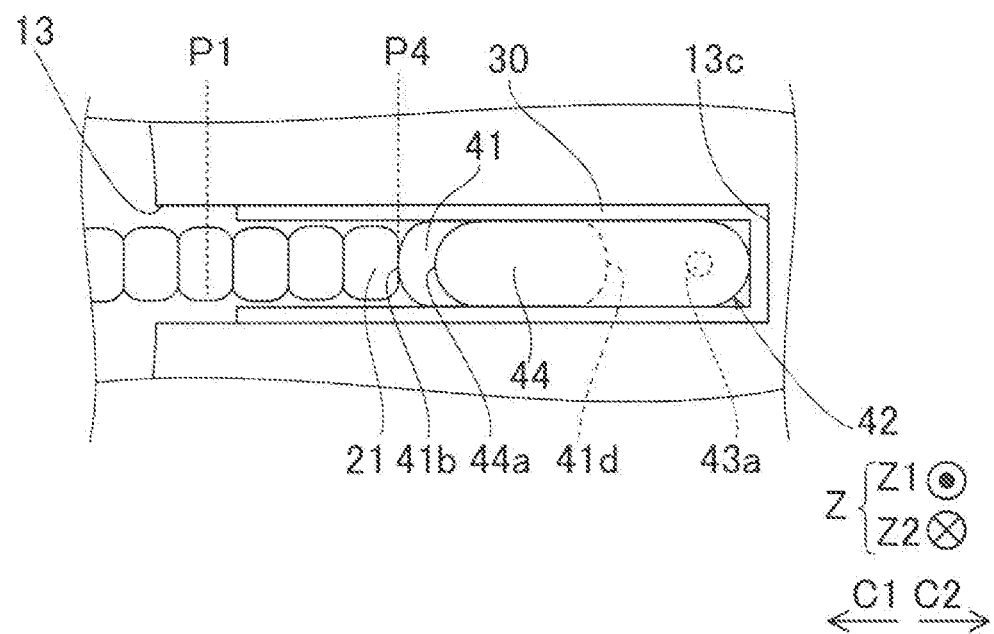
FIG. 11 illustrates the slot after the first guide jig is moved according to the embodiment as seen in the axial direction.

Consequently, as illustrated in FIG. 6, the first guide jig 41 is urged radially inward by the urging portion 60 which has the elastic members 61, and configured to be moved to a position on the radially inner side inside the hole portion 52a in the case where a force that resists the urging force F1 is not applied. That is, the radially inner end portion 41b of the first guide jig 41 is disposed at the radial position P1 (see FIG. 8). Meanwhile, as illustrated in FIG. 10, the first guide jig 41 is configured to be moved to a radial position on the radially outer side in the case where a radially outward force (pressing force F2) that resists the urging force is applied to the first guide jig 41. For example, as illustrated in FIG. 11, the end portion 41b of the first guide jig 41 is disposed at a radial position P4 on the radially outer side with respect to the radial position P1.

(Configuration of Second Guide Jigs)

As illustrated in FIG. 5, the second guide jigs 42 are each formed in a flat plate shape. The second guide jigs 42 are disposed at a radial position on the radially outer side with respect to the first guide jigs 41 so as to project from the upper end portion 50a of the base portion 50. As illustrated in FIG. 6, a projection height H2 of the second guide jig 42 from the base portion 50 in the axial direction is larger than the projection height H1 of the first guide jig 41. The projection height H2 of the second guide jig 42 means the length from the upper end portion 50a of the base portion 50 to a distal end portion 43a.

The second guide jig 42 includes a first portion 43, which is a portion on the side in the arrow Z1 direction including the distal end portion 43a, and a second portion 44, which is a portion on the root side (base portion 50 side) with respect to the first portion 43. In the present embodiment, the first portion 43 is tapered in the radial direction and the circumferential direction. Specifically, as illustrated in FIG. 6, a radially outer end portion 42a of the second guide jig 42 is formed along the axial direction. Inclined portions 43b and 43c formed so as to approach each other in radial position toward the distal end portion 43a are provided in the vicinity of the distal end portion 43a. In the second guide jig 42, as illustrated in FIG. 7B, the second portion 44 has a width W14 in the circumferential direction, and the first portion 43 is formed so as to become gradually smaller in width in the circumferential direction toward the distal end portion 43a. The second portion 44 is an example of the "projection portion." In the present embodiment, as illustrated in FIG. 8, the width W14 of the second guide jig 42 in the circumferential direction is generally equal to (preferably equal to) the width W11 of the first guide jig 41 in the circumferential direction. The radially outer end portion 42a of the second guide jig 42 is configured to press the back wall portion 32 of the insulating sheet 30 against the inner wall surface 13c of the slot 13.

As illustrated in FIG. 6, the second portion 44 is formed so as to project radially inward. That is, a radial position P2 (see FIG. 8) of an end portion 44a of the second portion 44 is provided on the radially inner side with respect to a radial position P3 of the distal end portion 43a of the first portion 43, and on the radially outer side with respect to the radial position P1 of the end portion 41b of the first guide jig 41. The second portion 44 is tapered from a radially outer portion toward the radially inner end portion 44a. That is, the radially inner end portion 42b of a portion of the second guide jig 42 on the root side with respect to the second portion 44 is provided on the radially outer side with respect to the radial position P2 of the radially inner end portion 44a of the second portion. A projection height H3 of the end portion 44a in the axial direction is larger than the projection height H1 of the first guide jig 41, and smaller than the projection height H2 of the distal end portion 43a. Consequently, as illustrated in FIG. 11, when the first guide jig 41 is moved to a radial position P4 on the radially outer side, the second portion 44 and a part of the first guide jig 41 are disposed so as to overlap each other as seen in the axial direction.

The second guide jig 42 is fixed to the base portion 50. Specifically, the second guide jig 42 is provided with fixed portions 42c and 42d. The fixed portions 42c and 42d are configured to be fitted with a fitting portion 51a of the radially outer base portion 51 and hole portions 52b and 52c of the upper base portion 52. Consequently, the second guide jig 42 is fixed in radial position and circumferential position. When the base portion 50 is moved in the axial direction, the first guide jig 41 and the second guide jig 42 are moved together in the axial direction. That is, in the present embodiment, the base portion 50 is configured to be movable along the axial direction with respect to the stator core 10 together with the first guide jig 41 and the second guide jig 42. Consequently, the second guide jig 42 is configured to be inserted into the slot 13 along the axial direction.

As illustrated in FIG. 8, the second guide jig 42 has a length L12 in the radial direction. The length L12 is set to be larger than half a length L21 from the radially outer end portion (back wall portion 32) of the insulating sheet 30 to the radially inner end portion 30c, for example. Consequently, the radial position P2 is positioned on the radially inner side with respect to the radially middle portion of the insulating sheet 30 with the second guide jig 42 disposed in the slot 13. The radial position P3 of the distal end portion 43a of the second guide jig 42 is disposed in a range of a regular triangle that includes the inner wall surface 13c of the slot 13 as one side. For example, the radial position P3 of the distal end portion 43a is provided within a distance of one-fifth of the length L21 from the inner wall surface 13c.

(Configuration of Coil Insertion Portion)

Figure 12:
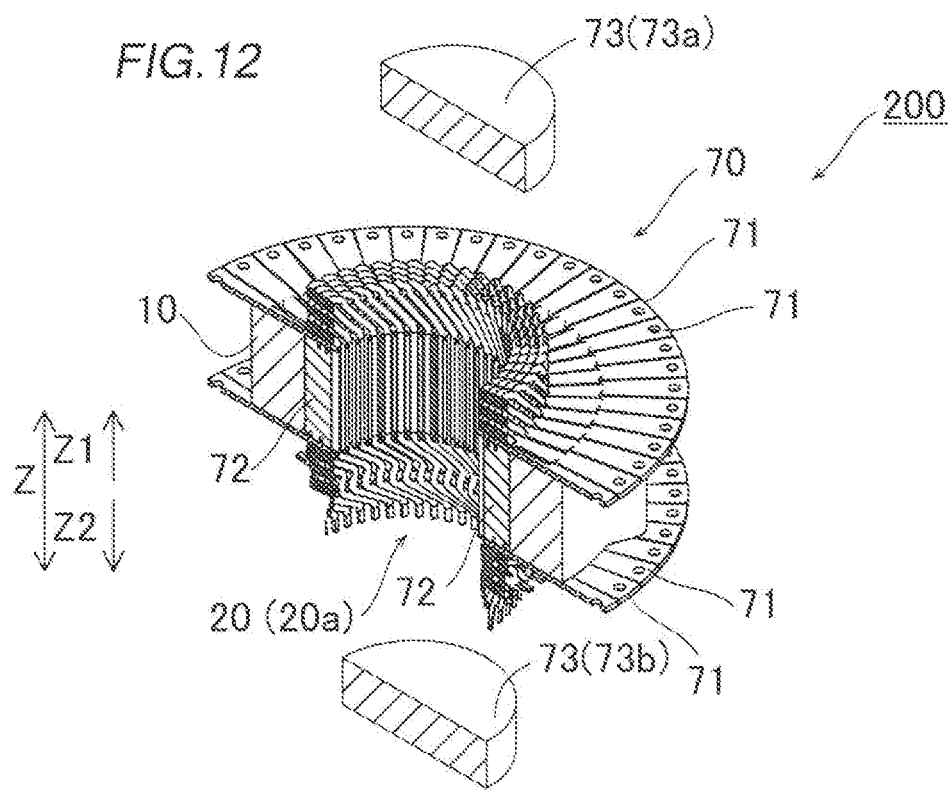
FIG. 12 is a perspective view illustrating the configuration of coil guide jigs of a coil insertion portion according to the embodiment.

As illustrated in FIG. 12, the assembly apparatus 200 for the stator 100 includes a coil insertion portion 70. In the present embodiment, the coil insertion portion 70 is configured to insert the slot-housed portion 21 into the slot 13 via the opening portion 13a by moving the coil 20 and the first guide jig 41 together toward the outer side in the radial direction with respect to the stator core 10 with the slot-housed portion 21 contacting the first guide jig 41.

Specifically, the coil insertion portion 70 includes coil guide jigs 71 and 72 that guide the coils when the coils 20 are inserted into the slots 13. The coil guide jigs 71 are provided on one side and the other side of the stator core 10 in the axial direction. The coil guide jigs 72 are disposed on the radially inner side of the teeth 12 of the stator core 10. The coil guide jigs 71 and 72 are configured to guide movement of the plurality of coils 20 in the radial direction by contacting the coils 20 when the plurality of coils 20 are inserted into the slots 13.

Figure 13:
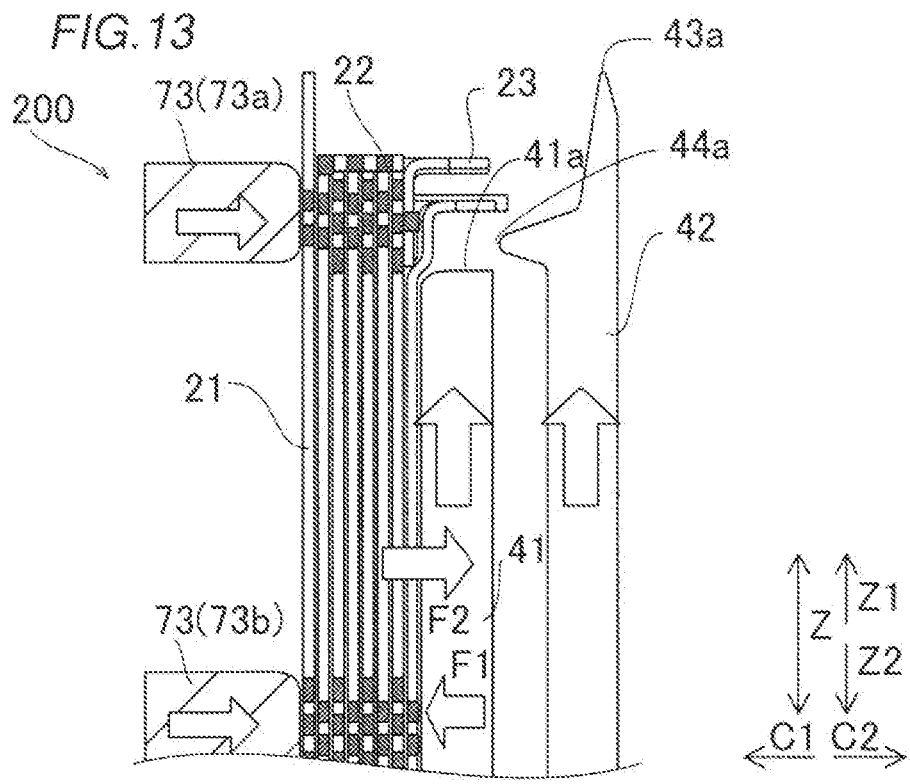
FIG. 13 illustrates a pressing portion of the coil insertion portion according to the embodiment.

In the present embodiment, as illustrated in FIG. 13, a pressing portion 73 is configured to press the slot-housed portions 21 against the first guide jig 41 radially outward against the urging force F1 which is exerted by the urging portion 60. Specifically, the pressing portion 73 includes a first pressing portion 73a disposed on the radially inner side of the coil end portion 22 on one side in the axial direction, and a second pressing portion 73b disposed on the radially inner side of the coil end portion 22 on the other side in the axial direction.

Figure 14:
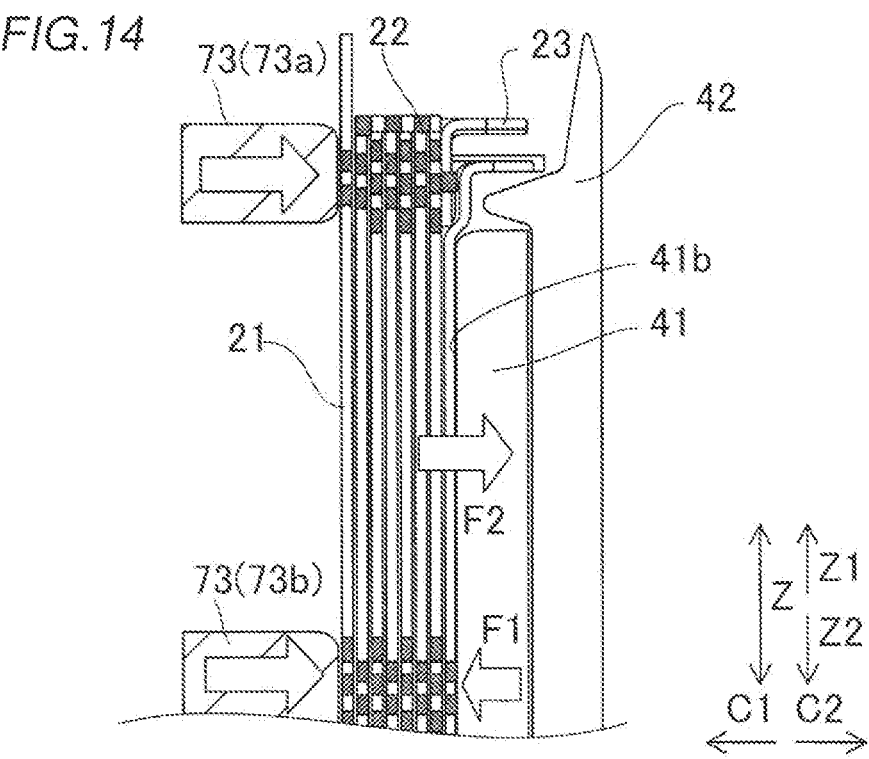
FIG. 14 illustrates a step of inserting a coil into a slot according to the embodiment.

The first pressing portion 73a and the second pressing portion 73b are configured to press the coil end portions 22 of the plurality of coils 20 (coil assembly 20a) from the radially inner side toward the radially outer side. Consequently, the slot-housed portions 21 which are continuous with the coil end portions 22 are moved radially outward to contact the first guide jig 41. The urging force F1 is applied to the radially inner side of the first guide jig 41 by the urging portion 60 as described above. As illustrated in FIG. 14, the pressing portion 73 moves the slot-housed portions 21 (coils 20) and the first guide jig 41 together toward the outer side in the radial direction by applying the pressing force F2, which is more than the urging force F1, from the slot-housed portions 21 to the first guide jig 41. The pressing portion 73 is configured to press the coil end portions 22 intermittently and repeatedly.

[Stator Assembly Method]

Next, an assembly method for the stator 100 will be described with reference to FIGS. 1, 6, 10, and 12 to 16. In the present embodiment, an assembly method for the stator 100 (see FIG. 1) which includes the stator core 10 which includes slots 13 that have opening portions 13a that open radially inward, coils 20 that include slot-housed portions 21 to be housed in the slots 13, and insulating sheets 30 disposed between the slots 13 and the slot-housed portions 21 will be described.

(Step of Disposing Insulating Sheets in Slots)

Figure 15:
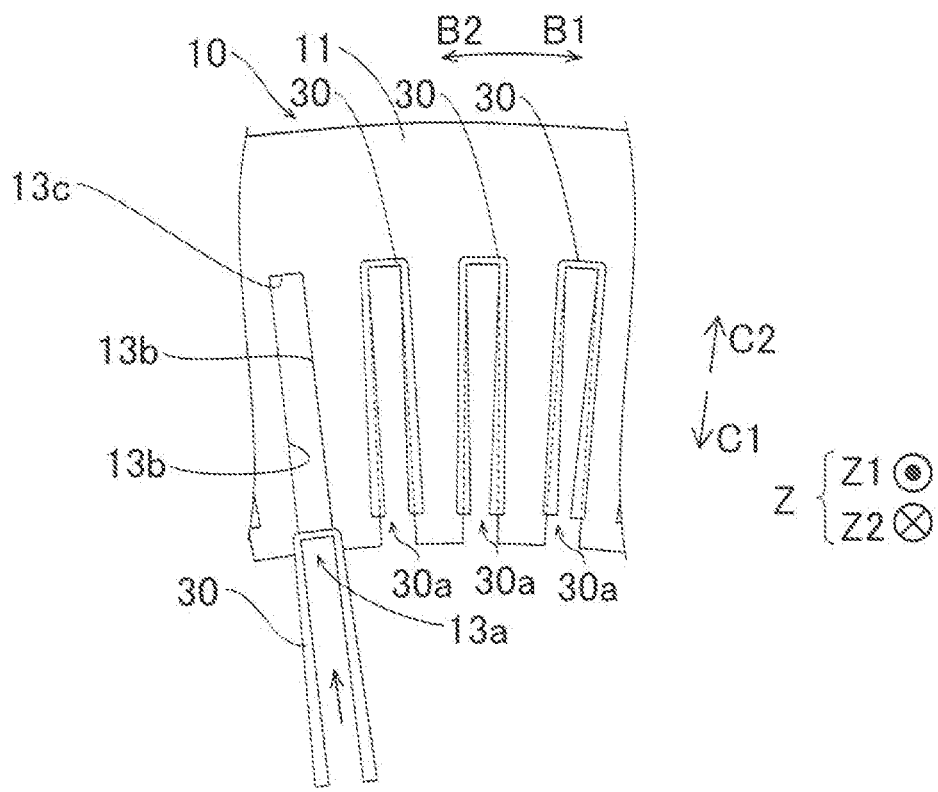
FIG. 15 illustrates a step of disposing insulating sheets in slots according to the embodiment.

First, as illustrated in FIG. 15, the insulating sheets 30 are disposed on the radially inner side of the stator core 10, and moved radially outward to be disposed in the slots 13. Before a step of opening the insulating sheets 30, the radially opening portions 30a of the insulating sheets 30 are more closed than a completely open state (with the first guide jigs 41 disposed in the insulating sheets 30). That is, the opening width of the radially opening portions 30a in the circumferential direction is smaller than the width W11.

(Step of Disposing Coil Guide Jigs)

As illustrated in FIG. 12, the coil guide jigs 71 and 72 are disposed on the stator core 10. The coil guide jigs 71 are disposed on both sides of the stator core 10 in the axial direction. The coil guide jigs 72 are disposed on the radially inner side of the stator core 10. The coil assembly 20a in an annular shape which is composed of a plurality of coils 20 is disposed on the radially inner side of the stator core 10.

(Step of Opening Insulating Sheets)

As illustrated in FIG. 13, the insulating member opening portion 40 (see FIG. 5) is disposed on one side of the stator core 10 in the axial direction (on the side in the arrow Z2 direction), and moved in the arrow Z1 direction, and the first guide jigs 41 and the second guide jigs 42 are inserted in the axial direction to the circumferentially inner side of the insulating sheets 30 in the slots 13 to open the radially opening portions 30a on the radially inner side of the insulating sheets 30.

That is, in the present embodiment, as illustrated in FIG. 8, a portion of the insulating sheet 30 at the position of insertion of the first guide jig 41 (portion thereof in the vicinity of the radial position P1) is opened with the second guide jig 42, which is fixed in radial position, inserted into the slot 13 at the radial position P3 on the radially outer side with respect to the first guide jig 41. Particularly, a portion of the insulating sheet 30 in the vicinity of the radial position P2 is opened with the first portion 43, which is a portion of the second guide jig 42 positioned on the radially outer side, inserted into the slot 13. After the start of insertion of the first portion 43, a portion of the insulating sheet 30 in the vicinity of the radial position P1 is opened with the second portion 44, which is positioned on the radially inner side, inserted into the slot 13. After the start of insertion of the second portion 44, the radially opening portion 30a of the insulating sheet 30 is opened with the first guide jig 41 inserted into the slot 13.

Particularly, the insulating sheet 30 is sequentially opened from the radially outer side toward the radially inner side (in the order of the radial positions P3, P2, and P1). The insulating member opening portion 40 (see FIG. 5) is disposed on the side in the arrow Z2 direction of the stator core 10 with the radially inner end portion 41b of the first guide jig 41 disposed at generally the same radial position as the radially inner end portion 30c of the insulating sheet 30, or at the radial position P1 on the radially inner side with respect to the end portion 30c, with the distal end portion 43a of the first portion 43 of the second guide jig 42 disposed at the radial position P3 on the radially outer side with respect to the radial position P1, and with the end portion 44a of the second portion 44 of the second guide jig 42 disposed on the radially inner side with respect to the radial position P3.

When the base portion 50 is moved in the arrow Z1 direction, the first guide jig 41 and the second guide jig 42 are moved together in the arrow Z1 direction. The distal end portion 43a of the second guide jig 42, which has the projection height H2, enters the inside of the insulating sheet 30 at the radial position P3. Consequently, the insulating sheet 30 is opened in the circumferential direction in the vicinity of the radial position P3. That is, the clearance on the circumferentially inner side of the insulating sheet 30 is increased to the width W14 in the vicinity of the radial position P3. At this time, the insulating sheet 30 is positioned in the radial direction with the back wall portion 32 of the insulating sheet 30 disposed between the end portion 42a of the second guide jig 42 and the inner wall surface 13c of the slot 13. The radially outer end portion 42a of the second guide jig 42 presses the back wall portion 32 of the insulating sheet 30 against the inner wall surface 13c of the slot 13.

The end portion 44a of the second guide jig 42, which has the projection height H3, enters the inside of the insulating sheet 30 at the radial position P2. Consequently, the insulating sheet 30 is opened in the circumferential direction in the vicinity of the radial position P2. That is, the clearance on the circumferentially inner side of the insulating sheet 30 is increased to the width W14 in the vicinity of the radial position P2.

The distal end portion 41a of the first guide jig 41, which has the projection height H1, enters the inside of the insulating sheet 30 at the radial position P1. Consequently, the insulating sheet 30 is opened in the circumferential direction in the vicinity of the radial position P1. Since the radial position P1 is positioned on the radially inner side with respect to the radially opening portion 30a of the insulating sheet 30, the radially opening portion 30a is opened when the first guide jig 41 is inserted into the slot 13. That is, the width of the radially opening portion 30a in the circumferential direction is the width W11.

(Step of Inserting Slot-Housed Portions into Slots)

Next, after the step of opening the insulating sheets 30, the slot-housed portions 21 are inserted into the slots 13 via the opening portions 13a by moving the coils 20 and the first guide jig 41 together toward the outer side in the radial direction with respect to the stator core 10 with the slot-housed portions 21 contacting the first guide jig 41.

In the present embodiment, as illustrated in FIGS. 6 and 10, the slot-housed portions 21 are inserted into the slots 13 via the opening portions 13a by moving the coils 20 and the first guide jig 41 together toward the outer side in the radial direction with respect to the stator core 10 so that the clearance D1 in the radial direction between the first guide jig 41 and the second guide jig 42 is reduced to D2.

In the present embodiment, as illustrated in FIG. 14, the slot-housed portions 21 are pressed radially outward against the first guide jig 41 by the pressing portion 73 with the first guide jig 41 urged radially inward by the urging portion 60, and the coils 20 and the first guide jig 41 are moved together toward the outer side in the radial direction with respect to the stator core 10 against the urging force F1.

Particularly, the first pressing portion 73a is disposed on the radially inner side of the coil end portion 22 on one side in the axial direction, and the second pressing portion 73b is disposed on the radially inner side of the coil end portion 22 on the other side in the axial direction. When the first pressing portion 73a and 73b are moved radially outward, the coil end portions 22 are pressed radially outward. The slot-housed portions 21, which are continuous with the coil end portions 22, abut against the first guide jig 41, and press the first guide jig 41 radially outward.

At this time, the slot-housed portions 21 press the first guide jig 41 with the pressing force F2 which is larger than the urging force F1, and therefore the slot-housed portions 21 and the first guide jig 41 are moved together toward the outer side in the radial direction. Since the second guide jig 42 is fixed in radial position, the distance between the first guide jig 41 and the second guide jig 42 is reduced from D1 (see FIG. 6) to D2 (see FIG. 10).

In the present embodiment, as illustrated in FIG. 11, a part of the first guide jig 41 and the second portion 44 of the second guide jig 42 overlap each other as seen in the axial direction. In other words, the first guide jig 41 is moved such that the first guide jig 41 is fitted into the second portion 44 of the second guide jig 42 toward the slot 13.

Figure 16:
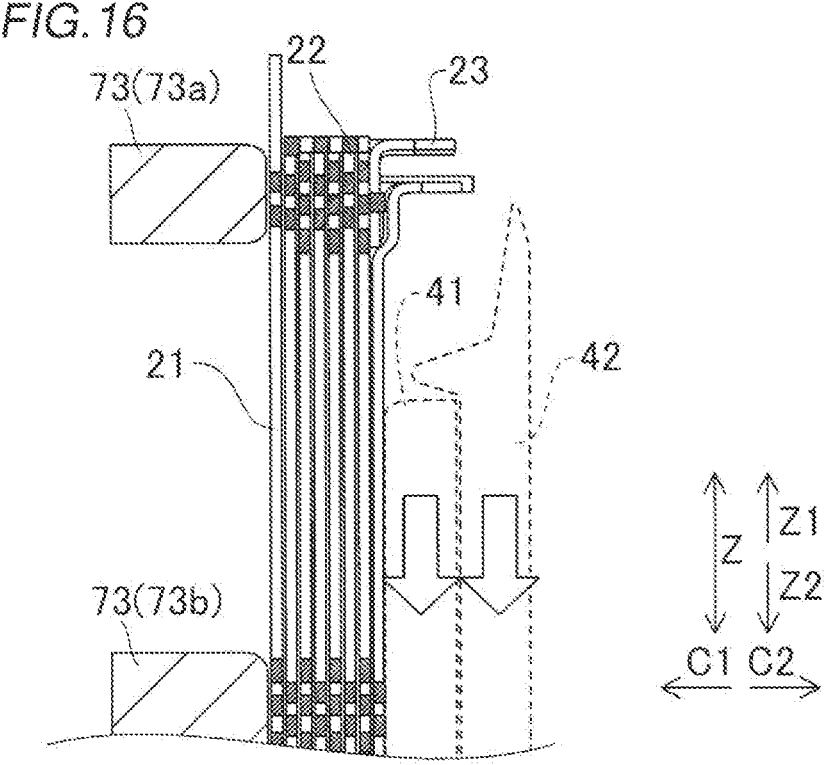
FIG. 16 illustrates retraction of the first guide jig and the second guide jig from the slot according to the embodiment.

In the present embodiment, as illustrated in FIG. 16, after movement of the slot-housed portions 21 and the first guide jig 41, the coils 20 are moved radially outward with the first guide jig 41 and the second guide jig 42 retracted in the arrow Z2 direction from the slot 13 by moving the first guide jig 41 and the second guide jig 42 together in the arrow Z2 direction. Consequently, the slot-housed portions 21 are disposed in the slots 13 as illustrated in FIG. 2. The assembly of the rotor 100 is completed as illustrated in FIG. 1.

[Effect of Assembly Method According to Present Embodiment]

The following effects can be obtained with the assembly method according to the present embodiment.

In the embodiment described above, the slot-housed portion (21) can be inserted into the slot (13) with a portion of the insulating member (30) for introduction of the slot-housed portion (21) (portion (30a) thereof on the one side in the radial direction) opened, by performing the step of inserting the slot-housed portion (21) into the slot (13) via the opening portion (13a) after the step of opening the portion (30a) of the insulating member (30) on the one side in the radial direction. Thus, interference between the slot-housed portion (21) and the insulating member (30) can be prevented. Consequently, it is possible to reliably secure the insulation between the slot-housed portion of the coil and the slot by preventing the insulating member (30) from being deformed in shape when the coil (20) is inserted into the slot (13) of the stator core (10). By moving the coil and the first guide jig (41) together toward the other side in the radial direction with respect to the stator core (10), the slot-housed portion (21) can be guided and moved toward the other side in the radial direction while maintaining a state in which the portion (30a) of the insulating member (30) on the one side in the radial direction is opened by the first guide jig (41). That is, the slot-housed portion (21) can be moved to a predetermined position in the slot (13) while maintaining a state in which the coil (20) and the insulating member (30) do not interfere with each other. Thus, the slot-housed portion (21) can be disposed in the slot (13) while further preventing the insulating member (30) from being deformed in shape. As a result, the insulation between the slot-housed portion (21) and the slot (13) can be further secured.

In the embodiment described above which is configured as described above, even in the case where the slot-housed portion (21) is sprung back, the first guide jig (41) and the slot-housed portion (21) press each other in the radial direction because of the urging force (F1), and thus the first guide jig (41) and the slot-housed portion (21) can be prevented from moving away from each other in the radial direction. Therefore, the insulating member (30) can be prevented from being housed in a gap in the radial direction between the first guide jig (41) and the slot-housed portion (21). Thus, the insulating member (30) can be further prevented from being deformed in shape when the coil (20) is inserted into the slot (13) of the stator core (10).

In the embodiment described above, the step of inserting the coil (20) is a step of inserting the slot-housed portion (21) into the slot (13) via the opening portion (13a) by moving the coil (20) and the first guide jig (41) together toward the other side in the radial direction with respect to the stator core (10) against an urging force (F1) by pressing the slot-housed portion (21) against the first guide jig (41) toward the other side in the radial direction with the first guide jig (41) urged toward the one side in the radial direction. With such a configuration, the coil (20) and the first guide jig (41) are moved toward the other side in the radial direction with a force applied thereto from both sides in the radial direction. Thus, the slot-housed portion (21) and the first guide jig (41) can be prevented from being brought from a contacting state into a separated state (state in which the slot-housed portion (21) is not guided). As a result, by preventing occurrence of a state in which the slot-housed portion (21) is not guided by the first guide jig (41), interference between the slot-housed portion (21) and the insulating member (30) can be reliably prevented by the first guide jig (41). For example, even in the case where the assembly apparatus (200) is configured such that the coil (20) is intermittently pressed toward the other side in the radial direction to vary a force for the slot-housed portion (21) to press the first guide jig (41), a state in which the slot-housed portion (21) and the first guide jig (41) contact each other can be maintained since the first guide jig (41) presses the slot-housed portion (21) of the coil (20) with the urging force (F1). With the configuration described above, in which the first guide jig (41) can be moved in the radial direction by the urging force (F1), the configuration of the assembly apparatus (200) can be prevented from being complicated (reduced in cost) compared to a case where a relatively complicated actuator is provided to move the first guide jig (41) in the radial direction.

In the embodiment described above, the step of opening the insulating member (30) is a step of inserting the first guide jig (41) into the slot (13) such that an end portion (41b) of the first guide jig (41) on the one side in the radial direction is disposed at the same radial position as an end portion (30c) of the insulating member (30) on the one side in the radial direction, or such that the end portion (41b) of the first guide jig (41) on the one side in the radial direction is disposed at a radial position (P1) more toward the one side in the radial direction than the end portion (30c) of the insulating member (30) on the one side in the radial direction. With such a configuration, the first guide jig (41) can start guiding the slot-housed portion (21) of the coil (20) with the slot-housed portion (21) contacting the end portion (41b) of the first guide jig (41) on the one side in the radial direction, before contacting the end portion (30c) of the insulating member (30) on the one side in the radial direction, when the slot-housed portion (21) enters the slot (13). As a result, the coil (20) is guided by the first guide jig (41) when the coil (20) passes the radial position of the end portion (30c) of the insulating member (30) on the one side in the radial direction. Thus, the insulating member (30) can be more reliably prevented from being deformed in shape with the coil (20) and the insulating member (30) interfering with each other.

In the embodiment described above, the step of opening the insulating member (30) is a step of opening a portion of the insulating member (30) at a position of insertion of the first guide jig (41) by inserting a second guide jig (42), which is fixed in radial position, into the slot (13) along the center axis direction at a radial position (P2, P3) on the other side in the radial direction with respect to the first guide jig (41), and opening the portion (30a) of the insulating member (30) on the one side in the radial direction by inserting the first guide jig (41) into the slot (13) along the center axis direction after start of insertion of the second guide jig (42). In the case where the portion (30a) of the insulating member (30) on the one side in the radial direction is closed, it is considered that the closed portion of the insulating member (30) and the first guide jig (41) which is inserted in the axial direction may interfere with each other. With the configuration of the embodiment described above, in contrast, the portion of the insulating member (30) on the other side in the radial direction is relatively opened, unlike the portion of the insulating member (30) on the one side in the radial direction (on the side of the opening portion (13a)). For example, if the insulating member (30) is provided with a portion (back wall portion (32)) corresponding to the bottom portion (root portion: portion on the back yoke (11) side) of the slot (13), the portion of the insulating member (30) on the other side in the radial direction is opened. Consequently, a gap for insertion of the first guide jig (41) can be formed in the insulating member (30) by inserting the second guide jig (42) into a portion of the insulating member (30) which is opened and at which interference does not tend to occur. Thus, the portion (30a) of the insulating member (30) on the one side in the radial direction can be opened easily by the first guide jig (41) while preventing interference between the first guide jig (41) and the insulating member (30).

In the embodiment described above, the step of inserting the coil (20) is a step of inserting the slot-housed portion (21) into the slot (13) via the opening portion (13a) by moving the coil (20) and the first guide jig (41) together toward the other side in the radial direction with respect to the stator core (10) such that a clearance in the radial direction between the first guide jig (41) and the second guide jig (42) becomes smaller. With such a configuration, the slot-housed portion (21) can be guided into the slot (13) by the first guide jig (41) while maintaining a state in which the portion of the insulating member (30) on the other side in the radial direction is opened by the second guide jig (42).

In the embodiment described above, the width (W14) of the second guide jig (42) in the circumferential direction is generally equal to the width (W11) of the first guide jig (41) in the circumferential direction. With such a configuration, the circumferential position of the insulating member (30) can be maintained by both the first guide jig (41) and the second guide jig (42) which are generally equal in circumferential width to each other. Thus, the insulating member (30) can be prevented from being displaced in position to prevent occurrence of a state in which appropriate insulation cannot be achieved.

In the embodiment described above, the step of opening the insulating member (30) is a step of opening the portion (30a) of the insulating member (30) on the one side in the radial direction by inserting a first portion (43), which is a portion of the second guide jig (42) positioned on the other side in the radial direction, into the slot (13), inserting a second portion (44), which is a portion of the second guide jig (42) positioned on the one side in the radial direction, into the slot (13) after start of insertion of the first portion (43), and inserting the first guide jig (41) into the slot (13) after start of insertion of the second portion (44). With such a configuration, the insulating member (30) can be opened sequentially from a portion on the other side in the radial direction, at which the insulating member (30) is relatively opened, toward the portion (30a) on the one side in the radial direction, at which the insulating member (30) is not relatively opened. As a result, with the first portion (43) of the second guide jig (42) inserted into the slot (13), interference between the second portion (44), which is inserted into the slot (13) thereafter, and the insulating member (30) can be prevented, and, with the second portion (44) inserted into the slot (13), interference between the first guide jig (41), which is inserted into the slot (13) thereafter, and the insulating member (30) can be prevented.

In the embodiment described above, the step of inserting the coil (20) is a step of inserting the slot-housed portion (21) into the slot (13) via the opening portion (13a) by moving the coil (20) and the first guide jig (41) together toward the other side in the radial direction with respect to the stator core (10) such that a part of the first guide jig (41) and the second portion (44) of the second guide jig (42) overlap each other as seen in the center axis direction. With such a configuration, the distance over which the first guide jig (41) is movable in the radial direction can be increased by the amount of overlap between the part of the first guide jig (41) and the second portion (44) of the second guide jig (42). Thus, the distance (region) over which the slot-housed portion (21) is guided by the first guide jig (41) can be increased compared to a case without such overlap.

In the embodiment described above, the step of inserting the coil (20) is a step of inserting the slot-housed portion (21) into the slot (13) via the opening portion (13a) by moving the coil (20) and the first guide jig (41) together toward the other side in the radial direction with respect to the stator core (10) with the coil (20) contacting the first guide jig (41), and thereafter moving the coil (20) toward the other side in the radial direction with the first guide jig (41) and the second guide jig (42) retracted in the center axis direction with respect to the slot (13) by moving the first guide jig (41) and the second guide jig (42) together in the center axis direction. With such a configuration, the first guide jig (41) and the second guide jig (42) are retracted in the center axis direction with respect to the slot (13) by moving the first guide jig (41) and the second guide jig (42) together in the center axis direction. Thus, an increase in the number of assembly steps can be prevented compared to a case where the first guide jig (41) and the second guide jig (42) are retracted individually.

By configuring the step of opening the insulating member (30) as in the embodiment described above, the slot-housed portion (21) can be guided by the first guide jig (41) with the insulating member (30) opened by the second guide jig (42). Consequently, the insulating member (30) can be prevented from being slackened convexly toward the inside of the slot (13). Thus, the insulating member (30) can be prevented from being housed in a gap in the radial direction between the first guide jig (41) and the slot-housed portion (21). As a result, the insulating member (30) can be further prevented from being deformed in shape when the coil (20) is inserted into the slot (13) of the stator core (10).

[Effect of Assembly Apparatus According to Present Embodiment]

The following effects can be obtained with the assembly apparatus according to the present embodiment.

With the embodiment described above, it is possible to provide the assembly apparatus (200) for the stator (100) which can reliably secure the insulation between the slot-housed portion (22) of the coil (20) and the slot (13) by preventing the insulating member (30) from being deformed in shape when the coil (20) is inserted into the slot (13) of the stator core (10).

In the embodiment described above, the insulating member opening portion (40) includes an urging portion (60) that urges the first guide jig (41) toward the one side in the radial direction; and the coil insertion portion includes a pressing portion (73) that presses the slot-housed portion (21) against the first guide jig (41) toward the other side in the radial direction against an urging force (F1) exerted by the urging portion (60). With such a configuration, the coil (20) and the first guide jig (41) are moved toward the other side in the radial direction with a force applied thereto from both sides in the radial direction by the urging portion (60) and the pressing portion (73). Thus, the slot-housed portion (21) of the coil (20) and the first guide jig (41) can be prevented from being brought from a contacting state into a separated state (state in which the slot-housed portion (21) is not guided). As a result, by preventing occurrence of a state in which the slot-housed portion (21) is not guided by the first guide jig (41), interference between the slot-housed portion (21) and the insulating member (30) can be reliably prevented by the first guide jig (41). By providing the insulating member opening portion (40) with the urging portion (60) and configuring the first guide jig (41) to be movable, the configuration of the assembly apparatus (200) can be prevented from being complicated (reduced in cost) compared to a case where a relatively complicated actuator is provided to move the first guide jig (41) in the radial direction (since there is no need for such an actuator).

In the embodiment described above, the urging portion (60) includes an elastic member (61) that is elastically deformable. With such a configuration, the urging portion (60) can be constituted easily by providing the urging portion (60) with the elastic member (61).

In the embodiment described above, the insulating member opening portion (40) includes a second guide jig (42) configured to be movable along the center axis direction, fixed at a radial position on the other side in the radial direction with respect to the first guide jig (41), and inserted into the slot (13) along the center axis direction. With such a configuration, a gap for insertion of the first guide jig (41) can be formed in the insulating member (30) by inserting the second guide jig (42) into a portion of the insulating member (30) on the other side in the radial direction which is opened and at which interference does not tend to occur. Thus, the portion (30a) of the insulating member (30) on the one side in the radial direction can be opened easily by the first guide jig (41) while preventing interference between the first guide jig (41) and the insulating member (30).

In the embodiment described above, the second guide jig (42) is tapered toward a distal end portion in the center axis direction as seen in the radial direction. With such a configuration, interference between the distal end portion (43a) of the second guide jig (42) and the insulating member (30) can be prevented, and thus the second guide jig (42) can be inserted into the slot (13) easily.

In the embodiment described above, the second guide jig (42) includes a projection portion (44) that projects toward the one side in the radial direction from a portion on a root side with respect to a distal end portion (43a) in the center axis direction. With such a configuration, the portion (30a) of the insulating member (30) on the one side in the radial direction can be opened by the projection portion (44) after the distal end portion (43a) of the second guide jig (42) is inserted into a portion of the insulating member (30) on the other side in the radial direction at which interference does not tend to occur. Thus, interference between the first guide jig (41) and the insulating member (30) can be further prevented.

In the embodiment described above, the insulating member opening portion (40) includes a jig moving mechanism portion (50) that moves the first guide jig (41) and the second guide jig (42) together along the center axis direction. With such a configuration, there is no need to individually move the first guide jig (41) and the second guide jig (42) in the axial direction, and the configuration of the insulating member opening portion (40) can be prevented from being complicated accordingly.

In the embodiment described above, a projection height (H2) of the second guide jig (42) from the jig moving mechanism portion (50) in the center axis direction is larger than a projection height (H1) of the first guide jig (41) from the jig moving mechanism portion. With such a configuration, the second guide jig (42), the projection height of which is relatively large, can be inserted into the slot (13) prior to the first guide jig (41) even in the case where the first guide jig (41) and the second guide jig (42) are moved together in the center axis direction by the jig moving mechanism portion (50).

In the embodiment described above, the width (W14) of the second guide jig (42) in the circumferential direction is generally equal to the width (W11) of the first guide jig (41) in the circumferential direction. With such a configuration, the circumferential position of the insulating member (30) can be maintained by both the first guide jig (41) and the second guide jig (42) which are generally equal in circumferential width to each other. Thus, it is possible to provide the assembly apparatus (200) for the stator (100) in which the insulating member (30) can be prevented from being displaced in position to prevent occurrence of a state in which appropriate insulation cannot be achieved.

MODIFICATIONS

The embodiment disclosed herein should be considered as exemplary and non-limiting in all respects.

For example, an assembly method and an assembly apparatus for a stator that includes a stator core in which an opening portion of a slot is provided on the radially inner side are described in relation to the embodiment described above. However, the present disclosure is not limited thereto. That is, the present disclosure may be applied to an assembly method and an assembly apparatus for a stator that includes a stator core in which an opening portion of a slot is provided on the radially outer side.

In the embodiment described above, the second guide jig is provided at the insulating member opening portion. However, the present disclosure is not limited thereto. For example, the radially opening portion of the insulating sheet may be opened by the first guide jig, rather than providing the second guide jig at the insulating member opening portion, in the case where the width of the stator core in the radial direction is relatively small.

In the embodiment described above, the second guide jig is formed in a flat plate shape. However, the present disclosure is not limited thereto. For example, a second guide jig 342 may be formed in a circular column shape as in an insulating member opening portion 340 according to a modification illustrated in FIG. 17. Specifically, the second guide jig 342 is tapered toward a distal end portion 343a of the second guide jig 342, and has a projection height H12 that is larger than the projection height H1 of the first guide jig 41. A base portion 350 is configured to fix the second guide jig 342 in radial position, and move the first guide jig 41 and the second guide jig 342 together in the axial direction.

In the embodiment described above, the urging portion is configured such that the first guide jig is urged by the spring members. However, the present disclosure is not limited thereto. For example, the urging portion may be configured such that the first guide jig is urged by cushioning members, rather than the spring members.

In the embodiment described above, the slot-housed portion which is continuous with the coil end portions is pressed against the first guide jig by pressing the coil end portions with the pressing portions. However, the present disclosure is not limited thereto. For example, the slot-housed portion may be pressed by the pressing portions, without pressing the coil end portions with the pressing portions, if the pressing portions are configured to be able to directly press the slot-housed portion.

The invention claimed is:

1. A stator assembly method of assembling a stator that includes a stator core that includes a slot that has an opening that opens on one side in a radial direction, a coil that includes a slot-housed portion housed in the slot, and insulation disposed between the slot and the slot-housed portion, the method comprising:
   disposing the insulation in the slot;
   opening a portion of the insulation on the one side in the radial direction by inserting a first guide jig into the insulation, which is disposed in the slot, along a center axis direction of the stator core, after disposing the insulation; and
   inserting the slot-housed portion into the slot via the opening by moving the coil and the first guide jig together toward the other side in the radial direction with respect to the stator core, after opening the portion of the insulation, wherein
   inserting the slot-housed portion includes inserting the slot-housed portion into the slot via the opening by moving the coil and the first guide jig together toward the other side in the radial direction with respect to the stator core against an urging force by pressing the slot-housed portion against the first guide jig toward the other side in the radial direction with the first guide jig urged toward the one side in the radial direction.

2. The stator assembly method according to claim 1, wherein
   opening the portion of the insulation includes inserting the first guide jig into the slot such that an end of the first guide jig on the one side in the radial direction is disposed at a same radial position as an end of the insulation on the one side in the radial direction, or such that the end of the first guide jig on the one side in the radial direction is disposed at a radial position more toward the one side in the radial direction than the end of the insulation on the one side in the radial direction.

3. The stator assembly method according to claim 1, wherein
   opening the portion of the insulation includes opening a portion of the insulation on the one side in the radial direction by inserting a second guide jig, which is fixed in a radial position, into the slot along the center axis direction at a radial position on the other side in the radial direction with respect to the first guide jig and opening the portion of the insulation at a position of insertion of the first guide jig, and by inserting the first guide jig into the slot along the center axis direction after start of insertion of the second guide jig.

4. The stator assembly method according to claim 3, wherein
   inserting the slot-housed portion includes inserting the slot-housed portion into the slot via the opening by moving the coil and the first guide jig together toward the other side in the radial direction with respect to the stator core such that a clearance in the radial direction between the first guide jig and the second guide jig becomes smaller.

5. The stator assembly method according to claim 2, wherein
   a width of the second guide jig in a circumferential direction is generally equal to a width of the first guide jig in the circumferential direction.

6. The stator assembly method according to claim 3, wherein
   opening the portion of the insulation includes opening the portion of the insulation on the one side in the radial direction by inserting a first portion, which is a portion of the second guide jig positioned on the other side in the radial direction, into the slot, inserting a second portion, which is a portion of the second guide jig positioned on the one side in the radial direction, into the slot after start of insertion of the first portion, and inserting the first guide jig into the slot after start of insertion of the second portion.

7. The stator assembly method according to claim 6, wherein
   inserting the slot-housed portion includes inserting the slot-housed portion into the slot via the opening by moving the coil and the first guide jig together toward the other side in the radial direction with respect to the stator core such that a part of the first guide jig and the second portion of the second guide jig overlap each other as seen in the center axis direction.

8. The stator assembly method according to claim 3, wherein
   inserting the slot-housed portion includes inserting the slot-housed portion into the slot via the opening by moving the coil and the first guide jig together toward the other side in the radial direction with respect to the stator core with the coil contacting the first guide jig, and then moving the coil toward the other side in the radial direction with the first guide jig and the second guide jig retracted in the center axis direction with respect to the slot by moving the first guide jig and the second guide jig together in the center axis direction.

9. A stator assembly method of assembling a stator that includes a stator core that includes a slot that has an opening that opens on one side in a radial direction, a coil that includes a slot-housed portion housed in the slot, and an insulation disposed between the slot and the slot-housed portion, the method comprising:
   disposing the insulation in the slot;
   opening a portion of the insulation on the one side in the radial direction by inserting a first guide jig into the insulation, which is disposed in the slot, along a center axis direction of the stator core, after disposing the insulation; and
   inserting the slot-housed portion into the slot via the opening by moving the coil and the first guide jig together toward the other side in the radial direction with respect to the stator core, after opening the portion of the insulation, wherein
   opening the portion of the insulation includes opening a portion of the insulation on the one side in the radial direction by inserting a second guide jig, which is fixed in radial position, into the slot along the center axis direction at a radial position on the other side in the radial direction with respect to the first guide jig, and opening the portion of the insulation at a position of insertion of the first guide jig, and by inserting the first guide jig into the slot along the center axis direction after start of insertion of the second guide jig.

10. A stator assembly apparatus that assembles a stator that includes a stator core that includes a slot that has an opening that opens on one side in a radial direction, a coil that includes a slot-housed portion housed in the slot, and an insulation disposed between the slot and the slot-housed portion, the apparatus comprising:
   an insulating member opener that includes a first guide jig configured to be movable along a center axis direction of the stator core and the radial direction of the stator core, and to open a portion of the insulation on the one side in the radial direction with the first guide jig inserted into the insulation, which is disposed in the slot, along the center axis direction; and
   a coil inserter that inserts the slot-housed portion into the slot via the opening by moving the coil and the first guide jig together toward the other side in the radial direction with respect to the stator core, wherein:
     the insulating member opener includes an urger that urges the first guide jig toward the one side in the radial direction; and
     the coil inserter includes a presser that presses the slot-housed portion against the first guide jig toward the other side in the radial direction against an urging force exerted by the urger.

11. The stator assembly apparatus according to claim 10, wherein
   the urger includes an elastic member that is elastically deformable.

12. The stator assembly apparatus according to claim 10 wherein
   the insulating member opener includes a second guide jig configured to be movable along the center axis direction, fixed at a radial position on the other side in the radial direction with respect to the first guide jig, and inserted into the slot along the center axis direction.

13. The stator assembly apparatus according to claim 12, wherein
   the second guide jig is tapered toward a distal end in the center axis direction as seen in the radial direction.

14. The stator assembly apparatus according to claim 12, wherein
   the second guide jig includes a projection that projects toward the one side in the radial direction from a portion on a root side with respect to a distal end in the center axis direction.

15. The stator assembly apparatus according to claim 12, wherein
   the insulating member opener includes a jig moving mechanism that moves the first guide jig and the second guide jig together along the center axis direction.

16. The stator assembly apparatus according to claim 15, wherein
   a projection height of the second guide jig from the jig moving mechanism in the center axis direction is larger than a projection height of the first guide jig from the jig moving mechanism.

17. The stator assembly apparatus according to claim 12, wherein
   a width of the second guide jig in a circumferential direction is generally equal to a width of the first guide jig in the circumferential direction.

18. A stator assembly apparatus that assembles a stator that includes a stator core that includes a slot that has an opening that opens on one side in a radial direction, a coil that includes a slot-housed portion housed in the slot, and an insulation disposed between the slot and the slot-housed portion, the apparatus comprising:
   an insulating member opener that includes a first guide jig configured to be movable along a center axis direction of the stator core and the radial direction of the stator core, and to open a portion of the insulation on the one side in the radial direction with the first guide jig inserted into the insulation, which is disposed in the slot, along the center axis direction; and
a coil inserter that inserts the slot-housed portion into the slot via the opening by moving the coil and the first guide jig together toward the other side in the radial direction with respect to the stator core, wherein
the insulating member opener includes a second guide jig configured to be movable along the center axis direction, fixed at a radial position on the other side in the radial direction with respect to the first guide jig, and inserted into the slot along the center axis direction.

\* \* \* \* \*